United States Patent
Jonason et al.

[11] 3,745,631
[45] July 17, 1973

[54] METHOD AND APPARATUS FOR MANUFACTURING FINNED HEAT EXCHANGERS

[75] Inventors: Karl Gunnar Jonason; Karl Harry Karlsson, both of Vasteras; Åke Gustaf Vilhelm Remning, Finspang, all of Sweden

[73] Assignee: Granges Essem Aktiebolag, Vasteras, Sweden

[22] Filed: Feb. 4, 1971

[21] Appl. No.: 112,732

[30] Foreign Application Priority Data
Feb. 5, 1970   Sweden.............................. 1498/70

[52] U.S. Cl............ 29/157.3 A, 29/202 R, 29/493, 228/4
[51] Int. Cl..... B21d 53/02, B23k 5/22, B23k 31/02
[58] Field of Search............ 29/157.3 A, 157.3 AH, 29/157.3 B, 493, 202 R; 228/4

[56] References Cited
UNITED STATES PATENTS
2,332,368   10/1943   Burtenshaw...................... 29/493 X
2,794,243   6/1957   Schweller.................. 29/157.3 B X Primary Examiner—Charles W. Lanham
Assistant Examiner—D. C. Reiley, III
Attorney—Waters, Roditi & Schwartz

[57] ABSTRACT

A method and apparatus for producing highly effective heat exchanger elements of the type which comprise corrugated surface enlarging members of strip material fixed to thin-walled substrates. The strip material, which can be either pre-corrugated or corrugated synchronously with the heat-exchanger element manufacturing process and which has a thickness of from 50–10μm, is advanced concurrently with a substrate material to a station at which the strip is lightly held in firm abutment with the substrate material by means of an impinging stream of gaseous medium and simultaneously metallurgically bonded to the substrate. The composite product is then cut into lengths to form finished heat exchanger elements.

15 Claims, 1 Drawing Figure

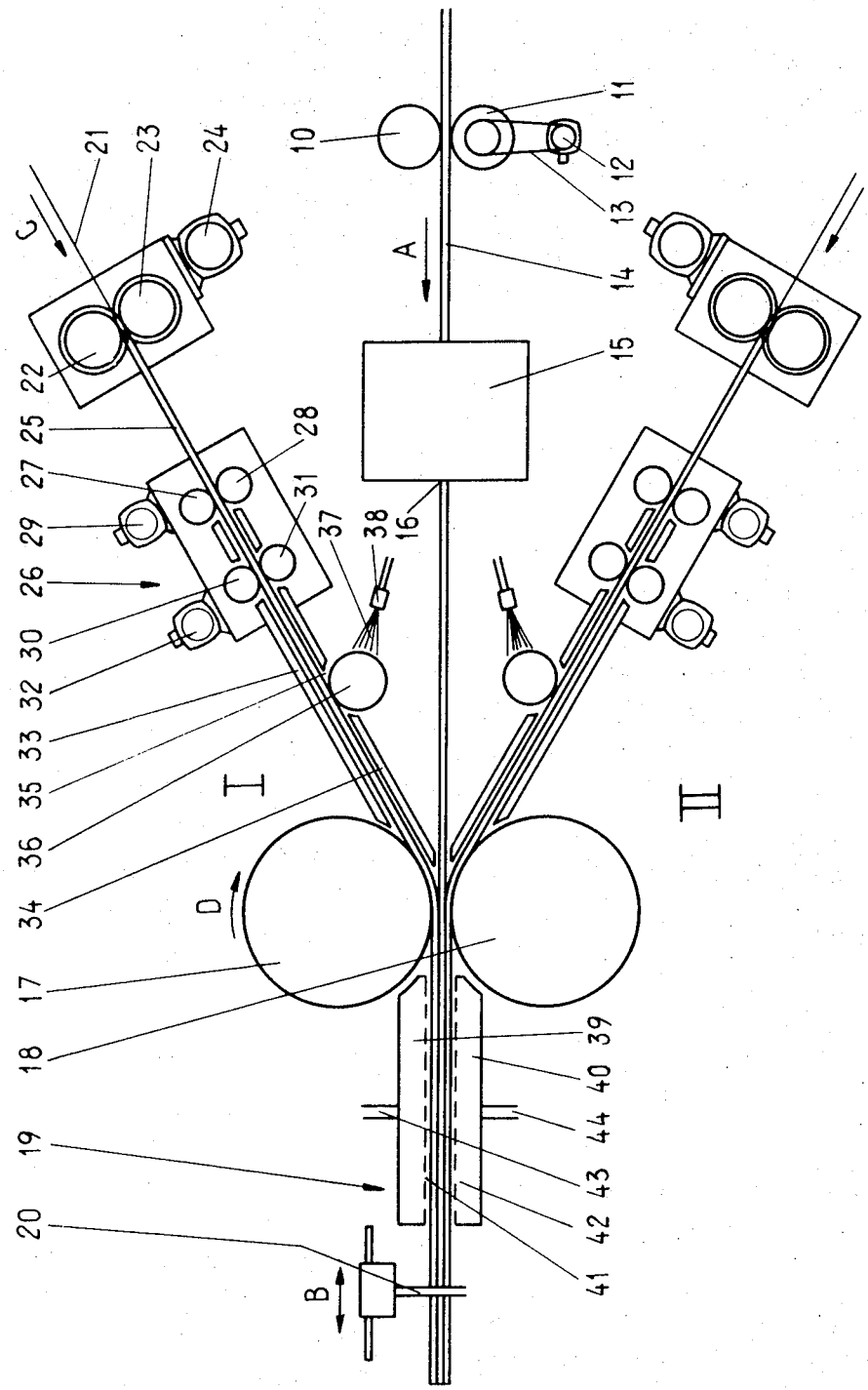

METHOD AND APPARATUS FOR MANUFACTURING FINNED HEAT EXCHANGERS

It has previously been proposed to use an elongated heat-exchange element blank for constructing heat-exchangers intended for cooling or heating purposes, preferably for use in motor vehicles, the blanks being provided along the length thereof with surface enlarging means in the form of metal strips folded transversely to the long axis thereof and which are in metallic contact with the basic profile.

The present invention relates to a method of mechanically manufacturing in elongated lengths blanks of the aforementioned type provided with surface enlarging means for heat-exchange elements intended for heat-exchangers for cooling or heating purposes, preferably for use in motor vehicles.

The method of the invention is mainly characterized by the fact that a metallic basic profile of arbitrary length is advanced in one longitudinal direction thereof together with at least one metal strip which has been permanently folded transversely of its long axis, and that said strip is guided with the wave crests of one side thereof in abutment with the advancing basic profile, that the abutting wave crests are permanently metallurgically bonded with the basic profile and that the basic profile bonded to said surface enlarging means is cut into desired lengths to form finished heat-exchange elements for use in the construction of the heat-exchanger.

The invention also relates to an apparatus for manufacturing elongated heat-exchange element blanks in accordance with the method of the invention.

The apparatus of the invention is mainly characterized by means for feeding the basic profiles in one longitudinal direction thereof along an individual movement path and means for advancing corrugated metal strip material together with said profile in a manner whereby said corrugated material is brought into abutment with the basic profile and carried by its movement, and means for metallurgically bonding the corrugated strip with the basic profile, and means for cutting the basic profile with the corrugated strip mounted thereon into desired lengths.

The invention will be described in more detail with reference to an embodiment thereof diagrammatically illustrated in the accompanying drawing, further characterizing features of the invention being disclosed in conjunction therewith. The drawing illustrates diagrammatically and in plan view an exemplary embodiment of a plant for carrying out the method of the invention.

In the exemplary embodiment of the plant there are included two feed rollers 10, 11, of which one is driven by a motor 12 over appropriate transmission means, for example a belt or chain transmission 13. The rollers 10 and 11 are arranged to feed an elongated basic profile 14, preferably at a determined speed, in the direction of arrow A, the basic profile being either of solid or hollow construction. Basic profiles manufactured continuously by known processes such as, for example, by extrusion or by shaping strip material into basic profiles, can be connected directly to the process of the invention without trespassing from the purview thereof.

For reasons of space, however, it is often advantageous to produce and pre-treat basic profile material, irrespective of whether it is solid or hollow, in separate processes and to convey the finished basic profile material from a place of storage to a starting station, from where it is fed between the rolls 10 and 11.

It is assumed in the following description that the basic profile material 14 fed in the direction indicated by arrow A in the drawing has previously been provided with a coating of an appropriate solder. It is preferred that the material from which the profile is made comprises copper or copper alloy, which is advantageous from the aspect of heat and soldering, although the selection of metal is naturally not restricted thereto, but can be broadened to include other metals suitable in the present context.

In the exemplary embodiment, the profile material 14 is fed through a pre-heat furnace or melt zone 15, wherein the solder on the profile is heated to a molten condition before leaving the furnace or zone 15 through the discharge openings 16, whence it is continuously moved in a rectilinear path in the direction of arrow A between two feed rollers 17 and 18. The profile passes from the rollers 17 and 18 through a combined cooling and holder-down means, generally indicated at 19, to be finally cut by means of cutting means 20 which operate according to the principle of flying shears, i.e. are able to move in the directions indicated by double arrow B. The cutting means and associated guide means can be adjusted with respect to the length of stroke and, moreover, the speed of movement of said cutting means can be adjusted to coincide with the speed at which the basic profile is advanced during the cutting period.

It is intended with the illustrated plant that the basic profile 14 shall be provided on two sides thereof with surface enlarging means in the form of corrugated metal strip, suitably comprising metals of very high thermal conductivity. When applying the method of the present invention, foil strip having thicknesses, for example, of between 100 and 10$\mu$m, suitably between 35 and 15$\mu$m, and preferably 25$\mu$m, can be used. Corrugated metal foil strip of such extreme thickness is, however, liable to become deformed and should therefore be processed mechanically to prevent the occurrence of deformations during the treatment process and during their period of conveyance to a position where they merge with the basic profile located between the feed rollers 17 and 18.

As will be seen from the drawing, duplicate devices are arranged on either side of the advanced profile 14 for handling and conveying the corrugated strip material to the position between the two rollers 17 and 18. The two handling and conveying means are generally indicated at I and II respectively and, since these devices are completely identical to each other, although in mirror image, only the device I will be described in detail, while it is at the same time assumed that the function of the two devices coincide in all parts thereof. The reference numeral 21 indicates metal strip, suitably of copper or copper alloy, moving in the direction of arrow C. This strip, which within the scope of the invention may have any suitable thickness, is presumed in the described example to have a foil thickness. The strip 21 is fed in the manner shown in the drawing into a folding means comprising two meshing cogs 22 and 23 driven by a motor 24. The strip is corrugated during its passage between the two cogs and leaves said cogs in the form of a coil strip 25 folded transversely of its longitudinal axis, the strip then being guided into a socalled compacting means indicated generally at 26. The compacting means includes two groups of feed rollers, i.e. rollers 27 and 28 driven by a motor 29 and rollers 30 and 31 driven by a motor 32. The drive motors are thus arranged to drive their respective pairs of rolls in a manner whereby the roll pair 30, 31 has a lower peripheral speed than the roll pair 28. Consequently, during its passage between the two pairs of rolls, the corrugated foil strip will be subjected to a continuous compression force in the direction of movement, owing to the disparity in peripheral speeds between the two pairs of rolls.

The longitudinally compressed, corrugated strip 25 is passed from the compacting means 26 between a pair of guide structures 33 and 34 towards the nip between feed rollers 17 and 18, the guide 34 presenting a cut away portion 35 in which projects an applicating roller 36 for a fluxing agent, which is applied to the wave crests of the passing corrugated strip 25. The fluxing agent 37 is sprayed onto the rotating roll 36 from a suitable nozzle 38, as shown in the Figure, the roller transferring the flux to the strip. The corrugated fluxed strip leaving the guide structures 33 and 34 is then entrained by the feed roller 17, which constantly rotates in the direction of arrow D, and is guided by said roll into abutment with the basic profile 14 passing between the rollers 17 and 18, the fluxed wave crests coming into contact with the molten solder on the basic profile 14. The basic profile and the corrugated strip are then fed into the holderdown means 19, which mainly comprises two guide structures 39 and 40 in the form of hollow boxes, the guide surfaces of which are provided with perforations 41 and 42. A gaseous medium such as air is introduced into the boxes through nozzle 43 and 44 respectively and caused to impinge on the corrugated strip. The gaseous medium cools the solder to the point of solidification and at the same time exerts a holding force on each of the two corrugated strips, thereby maintaining the strips in firm abutment with the sides of the basic profile. When the solder has solidified, the discharged basic profile will be provided with a permanently fixed continuous surface enlargement in the form of at least one corrugated metal strip which is in metallic contact with the basic profile. The basic profile provided with the surface enlargement as afore described is then cut into suitable, predetermined lengths by means of the cutting device 20, which together with its driving assembly is capable of moving in the direction of double arrow B at selective length of stroke and at a speed, when moving in the direction of feed of the basic profile, which coincides with the speed of the basic profile during the cutting period.

It also lies within the scope of the invention to provide the basic profile with solder over the whole of the part where soldering is to take place, or only at the calculated points of contact for the subsequently arriving corrugated strip. Further, the corrugated strip may also be provided with solder. In accordance with an alternative embodiment of the invention, the corrugated strip may be produced in a separate process or in a process directly connected to the described method. Thus, it is possible to produce the strip and corrugate the same in directly connected processes.

With respect to the basic profile, this may also be produced separately in a special process or also in a directly connected process. The profile used may either be solid or a hollow profile. In the latter instance, the profile may, for example, be made of a metal strip.

Furthermore, it is important that metals are selected; with respect to the profile and the corrugated strip, which can be metallurgically bonded together in a suitable manner. In the case of the basic profile, copper alloy, preferably copper-zinc-alloy is suitable, while in the case of the corrugated strip a copper alloy, preferably extremely pure copper is a suitable metal.

The invention is not restricted to the shown and described embodiment thereof but can be modified within the scope of the following claims.

What is claimed is:

1. A method for series manufacture of high-effective heat-exchange elements for heat exchangers intended for cooling or heating purposes, preferably for use in motor vehicles, and being of the type which comprise a cylindrical, metallic relatively thin-walled basic profile provided with a longitudinally extending surface enlarging member which is in the form of a metallic strip corrugated transversely of the longitudinal axis thereof and which is in intimate heat conducting contact with the basic profile, comprising the steps of providing, prior to the actual manufacture of the elements or in conjunction with said manufacture, desired lengths of said cylindrical profile, advancing said lengths of cylindrical profile in a known manner in series in one end direction thereof, advancing concurrently therewith extremely thin strip material which has been permanently corrugated transversely of its longitudinal axis, guiding the corrugated strip material successively into abutment with the basic profile, impinging a stream of a gaseous medium such as air against the corrugated strip material in order to exert a holding force so that the crests of the corrugations are held in firm abutment with said basic profile and simultaneously establishing a permanent metallic bond between the basic profile and said crests, and finally cutting the basic profile with the surface enlarging member permanently fixed along the length thereof into desired lengths to form finished heat-exchange elements.

2. A method according to claim 1, wherein the permanent metallic bond between the corrugated strip material and the basic profile is effected by a continuous soldering operation and wherein the gaseous medium is used to cool the joint created between the strip material and the basic profile.

3. A method according to claim 2, wherein the basic profile is provided with a solder composition and the solder heated to a molten state prior to bringing the corrugated strip material into abutment with the basic profile.

4. A method according to claim 3, wherein the basic profile is provided at at least the estimated positions of contact with the advancing corrugated strip with a solder composition simultaneously as it is advanced along its movement path.

5. A method according to claim 3, wherein the solder-coated basic profile is passed through a heating zone to melt the solder and maintain it in a molten state at the time of contact with the advancing corrugated strip material.

6. A method according to claim 4, wherein immediately upon contact of the corrugated strip with the basic profile and the solder applied thereto the corrugated strip is held lightly pressed against the basic profile by directing a gaseous medium against said strip material while cooling the solder to establish a permanent metallic joint between the basic profile and the corrugated strip material.

7. A method according to claim 1, wherein the strip material is corrugated in a process directly connected with the heat-exchanger elements manufacturing process.

8. A method according to claim 7, wherein the strip material is produced and corrugated in processes directly connected with the heat-exchanger element manufacturing process.

9. A method according to claim 1 wherein said cylindrical profile comprises a solid basic profile which is advanced in its longitudinal direction and provided with said surface enlarging member.

10. A method according to claim 1, wherein the basic profile comprises a copper alloy, preferably a copper-zinc alloy and the corrugated strip material comprises a copper alloy, preferably very pure copper.

11. A method according to claim 1, wherein the corrugated strip material is a metal foil having a thickness of the order of 50–10$\mu$m, preferably 35–15$\mu$m, suitably 25$\mu$m.

12. An apparatus for series manufacture of highly-effective heat-exchange elements for heat exchangers intended for cooling or heating purposes, preferably for use in motor vehicles, and being of the type which comprise a cylindrical, metallic basic profile provided with a longitudinally extending surface enlarging member which is in the form of a metallic strip corrugated transversely of the longitudinal axis thereof and which is in intimate heat conducting contact with the basic profile, said apparatus comprising first feed means for feeding said basic profile in one end direction thereof in an individual movement path, second feed means for feeding said corrugated metallic strip concurrently with said basic profile into abutment with said basic profile and entrained in the movement thereof, blower means positioned in the path of movement behind said corrugated strip and arranged to impinge a stream of gaseous medium against the corrugated strip material passing thereby so as to maintain said strip in abutment with and correctly distributed along the surface of the basic profile, and means operative in coordination with said blower means to successively establish metallic bonds between the basic profile and the crests of the corrugations of said strip during passage of said basic profile and said strip past said blower means.

13. An apparatus according to claim 12, wherein the means for establishing a permanent metallic bond between the basic profile and the corrugated strip material comprises a) a zone for melting or heating the solder composition applied to the basic profile, said zone being located in the movement path of the basic profile before the blower means, and b) the blower means in its simultaneous capacity as the cooling zone for said solder composition.

14. An apparatus according to claim 12, wherein there is arranged behind the combined holder means and cooling zone so called flying shear means, the length of stroke of which can be adjusted and which is arranged to be moved at the same speed as the basic profile during the cutting period.

15. An apparatus according to claim 12, wherein means for corrugating the strip material is placed in connection with the corrugated strip material feeding means.

* * * * *